United States Patent [19]

Mori et al.

[11] Patent Number: 4,510,492
[45] Date of Patent: Apr. 9, 1985

[54] MESSAGE COMMUNICATION METHOD AND SYSTEM

[75] Inventors: Kinji Mori, Kawasaki; Makoto Nohmi, Sagamihara; Shoji Miyamoto, Kawasaki; Hirokazu Ihara, Machida; Hiroshi Matsumaru, Katsuta; Katuaki Ikeda, Hachioji, all of Japan

[73] Assignee: Hitachi, Ltd., Tokyo, Japan

[21] Appl. No.: 366,782

[22] Filed: Apr. 8, 1982

[30] Foreign Application Priority Data

Apr. 8, 1981 [JP] Japan .................... 56-51786

[51] Int. Cl.³ .......................... H04Q 9/00; H04J 3/08
[52] U.S. Cl. ................. 340/825.05; 370/86; 370/88
[58] Field of Search ............ 340/825.05; 370/86, 370/88, 60, 94

[56] References Cited

U.S. PATENT DOCUMENTS

| | | | |
|---|---|---|---|
| 3,597,549 | 8/1971 | Farmer | 370/88 |
| 3,883,693 | 5/1975 | Moore | 370/88 |
| 3,890,471 | 6/1975 | Hachenburg | 370/88 |
| 4,039,757 | 8/1977 | Frisone | 370/88 |
| 4,354,263 | 10/1982 | Bordy et al. | 370/94 |
| 4,390,984 | 6/1983 | Sugiura et al. | 370/88 |

OTHER PUBLICATIONS

"The Exploratory System Control Model Multi-Loop Network", Daniel J. Paulish, AFIPS Conference Proceedings, 1979, pp. 935-940.

"Reliability Optimization in Multi-Loop Communication Network", IEEE Trans. Comm. Com.-21, No. 8, Aug. 1973, pp. 898-907.

Primary Examiner—Donald J. Yusko
Attorney, Agent, or Firm—Antonelli, Terry & Wands

[57] ABSTRACT

A message communication method and system in which a message signal to be communicated includes a function code signal portion and a data signal portion, the former being an index to the content of the latter and forming the substantial part of the message signal, and in which such a message signal is communicated not only among equipment blocks connected with one and the same communication line but also among those connected with different communication lines coupled with each other through a common equipment block connected with both of the coupled communication lines. Function codes being indices to the contents to data required to be processed by equipment blocks connected with the coupled communication lines are respectively registered in different memories in the common equipment block and the function code signal portions of message signals received by the common equipment block are compared with the stored function codes in the common equipment block and if concurrence takes place transferrence of the message signals between the coupled communication lines is effected.

6 Claims, 4 Drawing Figures

F I G. 2
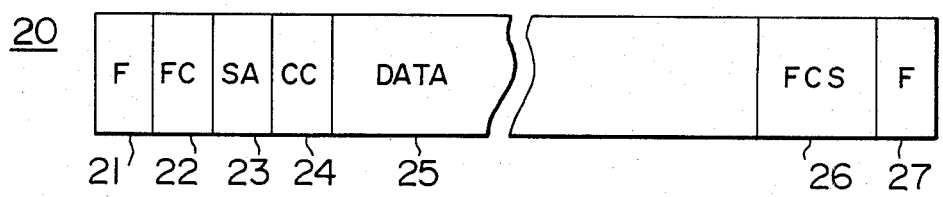

1

MESSAGE COMMUNICATION METHOD AND SYSTEM

The present invention relates to a communication system having a plurality of communication lines and a communication method in such system.

In a loop communication system having a plurality of communication loops coupled to each other, it is necessary to select only a message signal that is required for a particular loop in order to exchange a message signal between loops.

In the prior art, in order to couple a plurality of communication loops, a network control unit is provided for each of the loops for the exclusive purpose of coupling the loops. These exclusive network control units serve to determine whether or not a received message signal is to be transferred to another loop in the following manner: (1) Destination addresses and loop numbers and codes for discriminating the contents of the messages are previously stored in a ROM of the coupling network control unit, so that the unit, upon receiving a corresponding message signal, transfers it to a corresponding loop on the basis of comparison between the stored data and the message data; and (2) A processing unit connected to the coupling network control unit or a central processing unit connected to a loop issues an instruction to store the same discriminating information as those of (1) in a RAM provided in the coupling network control unit, so that the coupling network control unit upon receiving a corresponding message signal, transfers it to a corresponding loop. In the first-mentioned manner (1), modification and expansion of the messages (data) to be sent between loops are not easily attainable because information for discriminating whether a message signal is to be transferred between loops or not is previously stored in the ROM. In the second-mentioned manner (2), it is necessary that the processing unit be aware of all of the discriminating information on message signals to be sent between loops and the coupling configuration of the loops, and hence the subsystem (equipment blocks) connected to the loop cannot modify the message signals by its own discretion. Accordingly, both of the above-mentioned operations are inconvenient in that message signals to be sent between loops cannot be readily modified as required or exclusive coupling network control units are required.

Communication systems including a plurality of communication lines are, for example, disclosed in the following literatures:

Daniel J. Paulish: "The Exploratory System control Model Multi-Loop Network", AFIPS CONFERENCE PROCEEDINGS, 1979, pp. 935–940; and P. Zafilopulo: "Reliability Optimization in Multi-Loop Communication Network", IEEE Trans. Comm., Com-21, No. 8, Aug. 1973, pp. 898–907

An object of the present invention is to provide a communication method in which all of the network control units connected to communication lines have identical structures, and a message signal is transferred between communication lines depending upon the content of the message signal without making use of the address of a destination equipment block connected to one of the communication lines.

According to one of the important aspects of the present invention, in a communication network system in which a message signal, including a function code signal portion and a data signal portion, is communicated via communication lines each having a plurality of equipment blocks connected thereto, the function code signal portion of the message signal serves an index to the meaning of the data signal portion and at least one of the communication lines is coupled to a different communication line through a common equipment block connected to both of the coupled communication lines. The function codes serving as indices to the contents of data required to be processed in the equipment blocks connected to the coupled communication lines are registered in the common equipment block for each communication line. A message signal sent to one of the coupled communication lines from one of the equipment blocks connected to the communication line is received by the common equipment block, the function code signal portion of the received communication message signal is compared with the function codes serving as indices to data required to be processed in the equipment blocks connected to one of the coupled communication lines other than the communication line from which the message signal was received, the received message signal is transferred between the coupled communication lines only when the comparison results in a concurrence, and the transferred message signal is received by one of the equipment blocks connected to the second-mentioned one of the coupled communication lines.

According to another important aspect of the present invention, in the network communication system mentioned above, the common equipment block comprises first and second network control units each including memory means for storing function codes serving as indices to the contents of the data required to be processed by equipment blocks connected to an associated one of the coupled communication lines and each network control unit includes means for comparing the function code signal portion of a received message signal with the registered function codes stored in the memory means; and a processing unit is interconnected between the first and second network control units and includes means responsive to the output of the comparing means for transferring message signals received from the coupled communication lines via the first and second network control units to the second and first network control units, respectively.

The function code signal portion of a message signal is a signal portion representative of the meaning of the data signal portion and constitutes, in combination with the data signal portion, a particular control data, and thus the function code signal portion may be called an index to the content of the data signal portion. A function code signal portion, when combined with different data signal portions, constitutes different control data. Further, the function codes registered in the common and other equipment blocks being for comparison with the function code signal portions of the received messages are of the same nature.

The invention will now be described by way of example with reference to the accompanying drawings showing some embodiments, in which:

FIG. 2 is a diagram illustrating a format of a message signal which may be used in an embodiment of the present invention;

Figure 1:
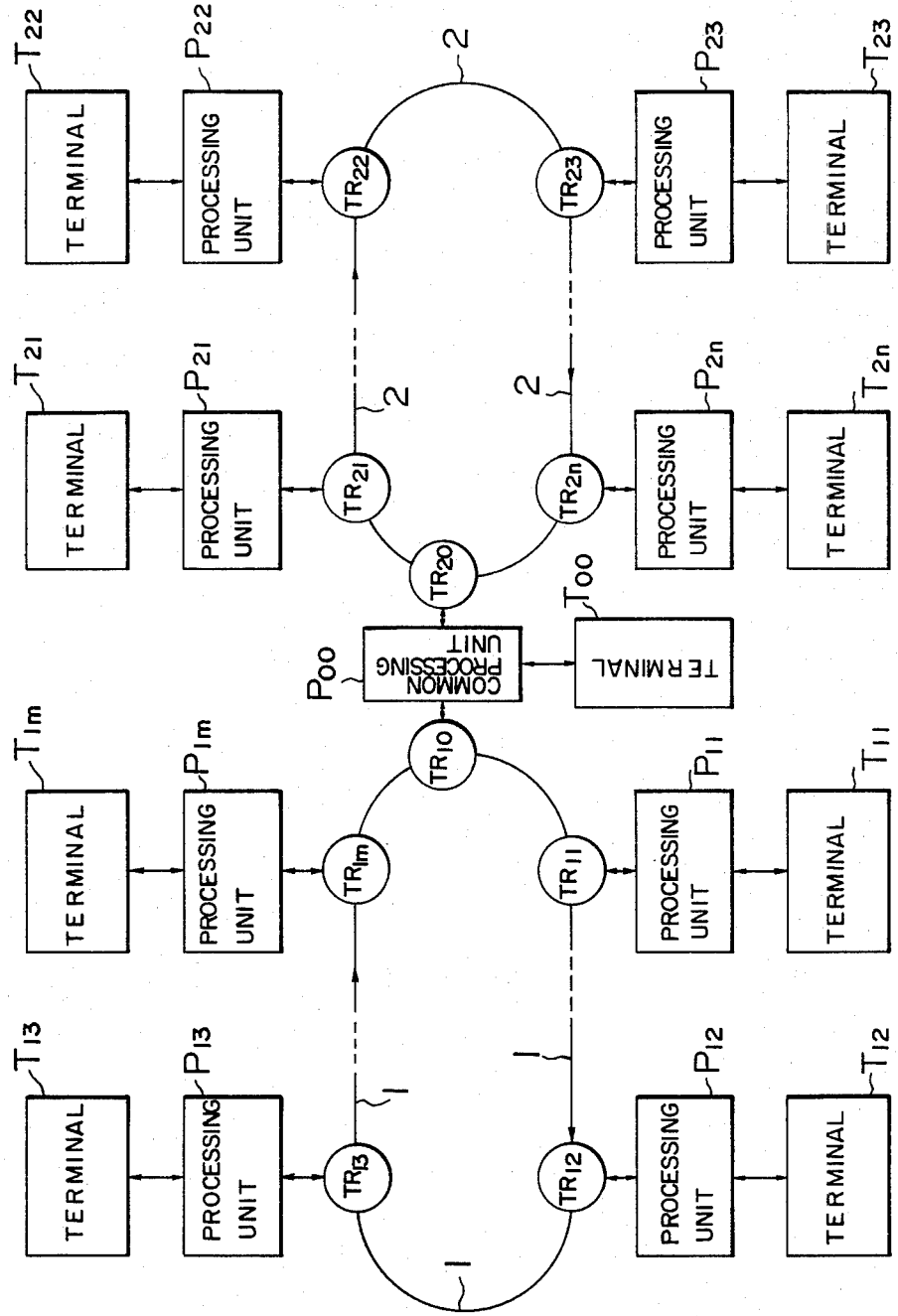
FIG. 1 is a block diagram useful for explaining the principle of the constitution of the communication method and system of the present invention.

Reference will first be made to FIG. 1 to describe the overall structure of a communication system in accordance with one embodiment of the invention. For the convenience of explanation, only two communication lines are shown and they are in the form of a communication loop. Thus, the communication loops will be referred to as loops hereinafter. The two loops 1 and 2 are coupled through a common equipment block including network control units $TR_{10}$ and $TR_{20}$ and a processing unit $P_{00}$ interconnected therebetween. A plurality of equipment blocks are connected to each of the loops. That is, each of the equipment blocks connected to the loop 1 includes a network control $TR_{11}$, $TR_{12}$, ... or $TR_{1m}$ and a processing unit $P_{11}$, $P_{12}$, ... or $P_{1m}$, while each of the equipment blocks connected to the loop 2 includes a network control unit $TR_{21}$, $TR_{22}$, ... or $TR_{2n}$ and a processing unit $P_{21}$, $P_{22}$, ... or $P_{2n}$. The network control units $TR_{10}$–$TR_{1m}$ and $TR_{20}$–$TR_{2n}$ are connected to the loops 1 and 2, respectively. The processing units $P_{11}$–$P_{1m}$ and $P_{21}$–$P_{2n}$ are connected to the network control units $TR_{11}$–$TR_{1m}$ and $TR_{21}$–$TR_{2n}$, respectively. The network control units $T_{10}$ and $T_{20}$ are connected to the common processing unit $P_{00}$. Further, terminals $T_{00}$, $T_{11}$–$T_{1m}$ and $T_{21}$–$T_{2n}$ are connected to the processing units $P_{00}$, $P_{11}$–$P_{1m}$ and $P_{21}$–$P_{2n}$, respectively. All of the network control units $TR_{10}$–$TR_{1m}$ and $TR_{20}$–$TR_{2n}$ are identical and the network control units $TR_{10}$ and $TR_{20}$ have no special function other than those of the other network control units. Each network control unit takes in only necessary ones of the message signals flowing in a loop and supplies them to its associated processing unit, and each network control unit produces a message signal from a submessage signal including a function code signal portion and a data signal portion supplied from the associated processing unit and sends out the message signal to the loop. In a sending operation mode, unlike prior art systems each network control unit sends out to its associated loop a message signal which does not include information on system configuration, the loop to which a message signal receiving network control unit belongs or a destination address.

The message format may be as shown in FIG. 2. Namely, a message signal may include flags F 21 and 27 indicative of the front end and the back end of a control data (or a message) which is the substance of the message signal, a data signal portion DATA 25, a function code signal portion FC 22, which is an index to the meaning of (is representative of the meaning of) the data signal portion and constitutes, in combination with the data signal portion, a particular control data, a sender address SA 23 indicative of the address of the network control unit of the message signal sending equipment block, a serial number CC 24 indispensable for a message signal sending, and a frame check sequence FCS 26 for checking bit errors which may occur during a sending procedure.

Meanwhile, the processing units $P_{00}$, $P_{11}$–$P_{1m}$ and $P_{21}$–$P_{2n}$ serve to process external data supplied from the terminals $T_{00}$, $T_{11}$–$T_{1m}$ and $T_{21}$–$T_{2n}$ or control data contained in message signals received from the loops 1 and 2 via the network control units $TR_{10}$–$TR_{1m}$ and $TR_{20}$–$TR_{2n}$ and to supply the result of the processing to their associated network control units in the form of a submessage signal by adding a function code to the processing result or to their associated terminals.

Figure 3:
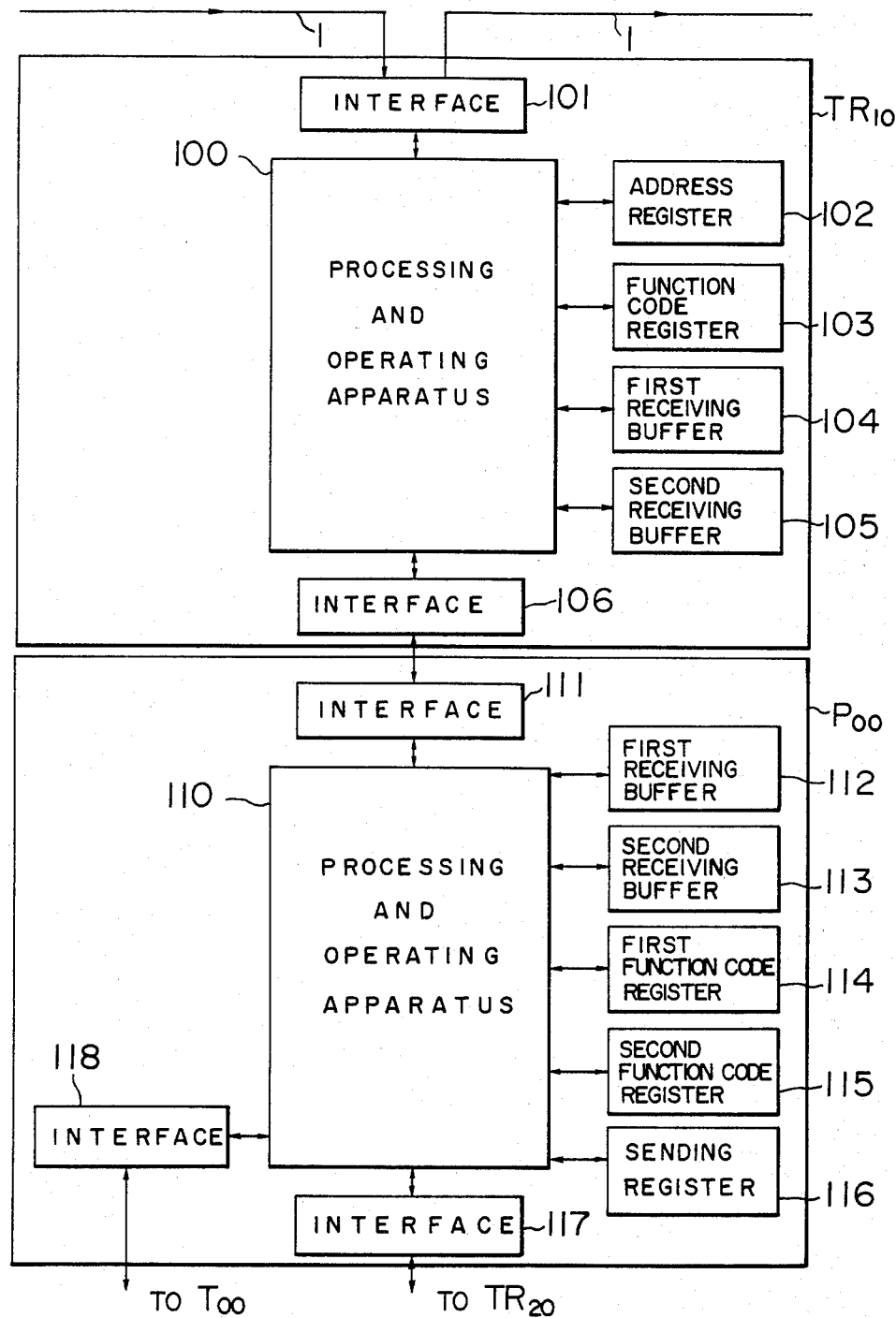
FIG. 3 is a diagram illustrating the structure of a common equipment block which may be used in an embodiment of the present invention.
Figure 4:
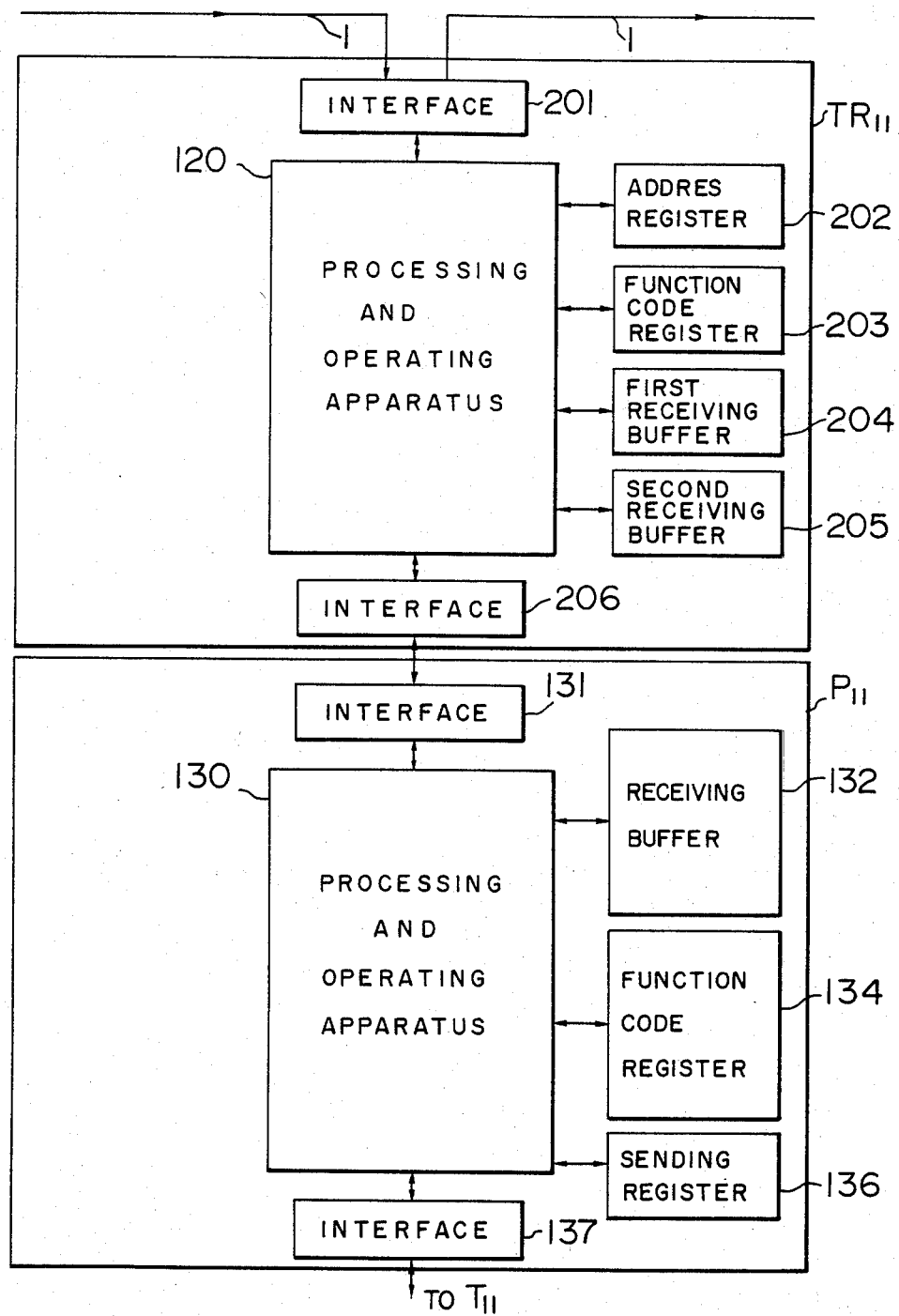
FIG. 4 is a diagram illustrating the structure of another equipment block which may be used in an embodiment of the present invention.

The network control units $TR_{10}$, $TR_{20}$, $TR_{11}$–$TR_{1m}$ and $TR_{21}$–$TR_{2n}$ and the processing units $P_{00}$, $P_{11}$–$T_{1m}$ and $P_{21}$–$P_{2n}$ may be constructed as shown in FIGS. 3 and 4, respectively. Each of the network control units serves to determine, on the basis of function codes registered therein, whether a message signal flowing in a loop is required to be processed by the processing unit connected with the network control unit and, if so, the network control unit takes in the message signal and returns the message signal to the loop, while if not, the network control unit merely returns the message signal to the loop. The description of this operation of the network control unit is applicable to the network control units $TR_{10}$ and $TR_{20}$ of the common equipment block and units $TR_{11}$–$TR_{1m}$ and $TR_{21}$–$TR_{2n}$ of the other equipment blocks.

FIG. 4 illustrates the structure of the equipment blocks connected to the loop 1 or 2 (not of the common equipment block) and exemplifies an equipment block including the network control unit $TR_{11}$ and the processing $P_{11}$. The network control unit $TR_{11}$ includes a processing and operating apparatus 20 which may be, for example, constituted by a 8-bit microprocessor, an address register 202 for storing a sender address SA representative of the equipment block when it is in a sending operation mode, a function code register 203 for storing function codes serving as indices to control data required to be processed by the processing unit $P_{11}$, a first receiving buffer 204 for storing a message signal received from the loop 1 when the equipment block is in a receiving operation mode, a second receiving buffer 205 for storing a submessage signal supplied from the processing unit $P_{11}$, an interface 201 provided between the processing and operating apparatus 120 and the loop 1, and another interface 206 provided between the processing and operating apparatus 120 and the processing unit $P_{11}$. The address register 202, function code register 203, and first and second receiving buffers 204 and 205 supply information to and receive information from the processing and operating apparatus 120.

The processing unit $P_{11}$ includes a processing and operating apparatus 130 which may be, for example, constituted by a 8-bit microprocessor, a receiving buffer 132 for storing a submessage signal supplied from the first receiving buffer 204 of the network control unit $TR_{11}$, a function code register 134 previously storing function codes (e.g., by using a ROM) serving as indices to control data required to be processed by the processing unit $P_{11}$, these function codes being supplied to the function register 203 of the network control unit $TR_{11}$ in the manner to be explained later, a sending resister 136 for temporarily storing information to be fed to the network control unit $TR_{11}$ or to the terminal $T_{11}$ from the processing unit $P_{11}$, an interface 131 provided between the processing and operating apparatus 130 and the network control unit $TR_{11}$, and another interface 137 provided between the processing and operating apparatus 130 and the terminal $T_{11}$. The receiving buffer 132, function code register 134 and sending register 136 supply information to and receive information from the processing and operating unit 100.

Now, description will be made of the registration of function codes in the network control unit $TR_{11}$, these function codes being indices to the meaning of control data required to be processed by the processing unit $P_{11}$. With the processing unit $P_{11}$ being powered, the processing and operating apparatus 130 of the processing unit $P_{11}$ loads the data field of the sending register 136 with the function codes stored in the function code register 134 and loads a function code field of the sending register 136 with a registration request code indicative of a request for registration of the content of the data field of the sending register 136 (i.e., registration of the function codes), the registration request code being produced by the apparatus 130 itself, whereby a submessage signal is set in the sending register 136. This submessage signal is sent by the processing and operating apparatus 130 to the network control $TR_{11}$ via the interface 131. The processing and operating unit 120 of the network control unit $TR_{11}$ stores the submessage signal (here, the registration request code+the function codes) received via the interface 131 into a second receiving buffer 205. Since the submessage signal send from the processing unit $P_{11}$ includes as the function code signal portion the registration request code $FC_r$, the processing and operating unit 120 stores the content of the data field 25, i.e., the data signal portion (here, the function codes) into the function code register 203 and formats the submessage signal by the interface 201 as shown in FIG. 2 and sends it out to the loop 1 through a sending operation procedure as will be described later for purposes of storing these function codes in the common equipment block.

Next, description will be made of the sending operation of the equipment block shown in FIG. 4. Control data to be sent from the equipment block includes a function code serving as an index to the meaning of the control data and produced by the processing and operating apparatus 130 and data. The function code and the data are stored in the sending register 136 by the processing and operating apparatus 130 in the processing unit $P_{11}$. More particularly, the data field of the sending register 136 is loaded with data information received from the terminal $T_{11}$ by the processing and operating apparatus 130 or with the function codes supplied from the function code register 134 in the above-mentioned function code registration procedure, and the function code field of the sending register 136 is loaded with function codes serving as indices to the meaning of the data field to thereby set a submessage signal in the sending register 136. Then, the apparatus 130 sends the submessage signal in the sending register 136 to the network control unit $TR_{11}$ via the interface 131. The submessage signal received by the unit $TR_{11}$ via the interface 206 from the processing unit $P_{11}$ is stored in the second receiving buffer 205 by the processing and operating apparatus 120. The apparatus 120 then adds to the content of the second receiving buffer 205 a sender address SA stored in the address register 202, flags F and a frame check sequence FCS both provided by the interface 201 and a serial number CC produced by the apparatus 120 itself to form a message signal of such a format as shown in FIG. 2 and sends it out to the loop 1 via the interface 201. When the message signal sent out by the network control unit $TR_{11}$ returns thereto after the circulation through the loop 1, the network control unit $TR_{11}$ erases that message signal from the loop 1 and clears the submessage signal stored in the second receiving buffer 205 which is the same as the function code signal and data signal portions of the erased message signal. If the message signal does not return within a predetermined time period due to, for example, temporary fault in the loop 1, the submessage signal stored in the second receiving buffer 205 is retained, and it is re-sent in the form of a message signal by a predetermined number of times until the message signal returns.

An example of the message communication method by the use of the content code is disclosed in copending U.S. patent application Ser. No. 232,006 filed on Feb. 6, 1981, and assigned to the assignee of the present application.

FIG. 3 illustrates an example of the structure of the common equipment block. It is noted that the common equipment block serves to transfer a message signal between loops coupled through the common equipment block, but may also serve to operate in the same manner as the other equipment block, as the case demands. Since both of the network control units $TR_{10}$ and $TR_{20}$ have the same structure as that of the network control unit $TR_{11}$ shown in FIG. 4, as described above, explanation of the structures of the units $TR_{10}$ and $TR_{20}$ will be omitted. Different reference numerals are given to similar members, however, as indicated.

The processing unit $P_{00}$ includes a processing and operating apparatus 110 which may be for example, constituted by a 8-bit microprocessor, first and second receiving buffers 112 and 113 for storing submessage signals supplied from the first receiving buffers of the network control units $TR_{10}$ and $TR_{20}$, respectively, first and second function code registers 114 and 115 previously storing function codes (e.g., by using ROM's) serving as indices to the meaning of the control data which are required to be processed by the processing unit $P_{00}$, the function codes being supplied from the function code registers of the network control units $TR_{10}$ and $TR_{20}$, respectively as will be described later, a sending register 116 for temporarily storing information to be fed to the network control units $TR_{10}$ and $TR_{20}$ or to the terminal $T_{00}$, interfaces 111 and 117 provided between the processing and operating apparatus 110 and the network control units $TR_{10}$ and $TR_{20}$, and another interface 118 provided between the processing and operating apparatus 110 and the terminal $T_{00}$. The first and second receiving buffers 112 and 113, first and second function code registers 114 and 115 and a sending register 116 supply information to or receive information from the processing and operating apparatus 110.

Description will next be made of the registration of the function codes in the network control units $TR_{10}$ and $TR_{20}$, these function codes serving as indices to the contents of control data required to be processed by processing unit $P_{00}$. Here, although the description of the structure and the function code registration will be made only in relation to the transferrence of a message signal between loops, registration of function codes serving as indices to the meaning of control data, which is similar to control data required to be processed by the processing unit $P_{11}$ shown in FIG. 4, may also be possible, in the same manner as described with reference to FIG. 4.

Referring again to FIG. 3, the processing unit $P_{00}$ produces submessage signals from the function codes stored in the first and second function code registers 114 and 115 and sets them in the sending register 116, and then supplies them to the network control units $TR_{10}$ and $TR_{20}$ via the interfaces 111 and 117, respectively, like the processing unit $P_{11}$ shown in FIG. 4. The function codes are then stored in the function code registers in the respective network control units $TR_{10}$ and $TR_{20}$, in the same manner as described with reference to FIG. 4. More particularly, the first and second function code registers 114 and 115 contain only registration request codes $FC_r$ previously stored in ROM's. Therefore, the function code signal portions of the submessage signals to be sent to the network control units $TR_{10}$ and $TR_{20}$ from the processing unit $P_{00}$ contain the registration request codes $FC_r$ produced by the processing and operating apparatus 110 and the data signal portions thereof contain registration request codes $FC_r$ sent from the first and second function code registers 114 and 115 of the processing unit $P_{00}$. Thus, the registration request codes requesting function code registration are stored in the function code registers of the network control units $TR_{10}$ and $TR_{20}$.

Next, the receiving operation of the equipment blocks other than the common equipment block will be described. Each network control unit stores a message signal flowing in the loop into the first receiving buffer to compare the function code signal portion of the received message signal with the function codes stored in the function code register by the processing and operating apparatus in each network control unit. If the comparison results in a concurrence the processing and operating apparatus supplies the function code and data signal portions of the received message signal, in the form of a submessage signal, to the processing unit connected with the network control unit in which the processing and operating apparatus is contained, and further sends the received message signal back to the loop. The processing unit processes the supplied submessage signal as required under control of the processing and operating apparatus of the processing unit. If the comparison does not result in a concurrence, the network control unit merely sends the received message signal back to the loop, without supplying anything to its associated processing unit.

Referring again to FIG. 3, description will be made of operations necessary for the common equipment block to effect transferrence of a message signal between loops, i.e., sending of initial message signals, reception of initial message signals, and registration of function code signal portions of the received initial message signals. The "initial message signal" used in the specification is intended to mean a message signal having a format shown in FIG. 2 and sent to a loop from an equipment block other than the common equipment block in which the function code registration has been done, and the initial message signal has in the function code signal portion a registration request code and in the data signal portion a function code serving as an index to the meaning (being representative of the meaning) of control data which is required to be processed in an equipment block.

As shown been already described, the function code register of each of the network control units $TR_{10}$ and $TR_{20}$ contains the registration request code $FC_r$ therein. Thus, a message signal (an initial message signal) having a function code signal portion requesting registration of a function code and sent from a network control unit ($TR_{11}$–$TR_{1m}$) on the loop 1 or a network control unit ($TR_{21}$–$TR_{2n}$) on the loop 2 is taken into the network control unit $TR_{10}$ or $TR_{20}$ of the common equipment block and sent to the processing unit $P_{00}$ in the form of a submessage signal. The processing and operating apparatus 110 in the common processing unit $P_{00}$ stores the submessage signal supplied from the network control unit $TR_{10}$ or $TR_{20}$ through the interface 111 or 117 into the first receiving buffer 112 or the second receiving buffer 113, respectively. The processing and operating apparatus 110 of the processing unit $P_{00}$ transfers the content codes FC, stored in the first or second receiving buffer 112 or 113 and required by the network control units connected to the loop 1 or 2, to the second or first function code register 115 or 114, respectively. The processing and operating unit 110 then stores the function codes, stored in the first or second function code register 114 or 115 and required by the network control units on the loop 2 or the loop 1, into the function code register of the network control unit $TR_{10}$ or $TR_{20}$ through the interface 111 or 117, respectively, according to the same procedure as described with respect to the function code registration referring to FIG. 4. The network control units $TR_{10}$ and $TR_{20}$ further send message signals, having the registration request code and the function code in the function code signal portion, and data signal portion respectively, and being in the format shown in FIG. 2, to the loops 1 and 2.

In this manner, the content codes FC required by the network control units on the loops 1 and 2 are registered in the network control units $TR_{20}$ and $TR_{10}$ of the common equipment block coupling the loops 1 and 2. Thus, only the message signals required by the equipment blocks connected with the loops 1 and 2 are now ready for transferrence from the loop 2 to the loop 1 or vice versa.

Transferrence of a message signal will next be described. Each equipment block becomes ready for sending and receiving operations after function codes, serving as indices to the meaning of control data required to be processed in the equipment block, are received and stored in its network control unit from its processing unit. The processing and operating apparatus 130 or 110 of the processing unit $P_{11}$ or $P_{00}$ starts a corresponding program based on data taken from the terminal $T_{11}$ or $T_{00}$ (e.g., a CRT display device) through the interface 137 or 118. The processing and operating apparatus 130 or 110 stores in the sending register 136 or 116 data obtained through operations based on the program, together with function codes serving as indices to the contents of the data and produced by the processing and operating apparatus, thereby setting a submessage signal in the sending register. When the submessage signal is stored in the sending register 136 or 116, the processing and operating unit 130 or 110 of the processing unit $P_{11}$ or $P_{00}$ sends out the stored submessage signal to the loop 1 or the loops 1 and 2 by the interface 131 or the interfaces 111 and 117 through the network control unit $TR_{11}$ or the transmission control units $TR_{10}$ and $TR_{20}$ in the form of a message signal. When the message signal thus sent out to the loop 1 reaches the network control unit $TR_{10}$, and if one of the function codes stored in the function code register 103 and required by the equipment block connected with the loop 2 is concurrent with the function code signal portion of the message signal, the network control unit $TR_{10}$ transfers it to the processing unit $P_{00}$ and also sends it back to the loop 1. When the message signal received from the loop 1 is supplied to the processing unit $P_{00}$, from the network control unit $TR_{10}$, it temporarily stores the submessage signal portion of the message signal in the first receiving buffer 112 and then transfers the submessage signal to the network control unit $TR_{20}$ and clears the submessage signal stored in the first receiving buffer 112. The network control unit $TR_{20}$ transforms the submessage signal including the function code signal portion and the data signal portion transferred from the processing unit $P_{00}$ to a message signal having such a format as shown in FIG. 2 and sends out the message signal to the loop 2. In this manner, only the message signal required by the loop 2 is transferred from the loop 1 to the loop 2. The network control unit $TR_{20}$ serves as a sending station for the message signal sent out to the loop 2 from the network control unit $TR_{20}$. Thus, the network control unit $TR_{20}$ erases the message signal circulated through the loop 2 or resends the message signal when the message signal does not return through the loop 2 within a predetermined time period.

The registration of the requested function code, the reception in accordance with the function code and the sending of the message have thus far been explained.

The function codes serving as indices to the meaning of the data required by processing units may be required to be changed with time in certain circumstances. In such a case the corresponding processing units execute a request for registration of new function codes each time they desire to update the contents of the function code registers in the associated network control unit of equipment blocks and the network control units $TR_{10}$ and $TR_{20}$ of the common equipment block which couples the loops 1 and 2.

As seen from the interloop message transfer procedures described above, the function code registration request message signal (initial message signal) as well as other message signal are transferred between the loops through the common equipment block including the processing unit $P_{00}$. The present invention is effective where a plurality of loops (communication lines) are coupled to one loop (communication line) or a plurality of loops (communication lines) are coupled to the respective loops (communication lines).

In accordance with the present invention, it is possible to transfer only the necessary data between the communication lines in a communication network system including a plurality of communication lines coupled to each other, without using specially designed network control units and without requiring the identification of the communication line with which the receiving network control unit is connected. The present system is readily adaptable to any change in the position of the receiving network control unit.

We claim:

1. A message communication method in a network system including a plurality of communication lines a plurality of intra-line equipment blocks and at least one common equipment block, each of said intra-line equipment blocks being connected to one of said communication lines, at least a first one of said communication lines being coupled to at least a second one of said communication lines through a common equipment block which is connected to both of the coupled first and second communication lines, said common equiment block having a first network control unit connected to said first communication line and a second network control unit connected to said second communication line, each message signal to be communicated via the communication lines having a format including a function code signal portion and a data signal portion, the function code signal portion being an index to the meaning of the data signal portion and forming in combination with the data signal portion control data constituting the substance of the message signal, the method comprising the steps of:

registering second function codes and first function codes in said first and second network control units of said common equipment block, respectively, said first and second function codes being indices to the meaning of the data required to be processed in the equipment blocks connected to said first communication lines and said second communication line, respectively;

sending a message signal from any one of said equipment blocks to the communication line to which it is connected;

receiving message signals in said common equipment block from said coupled communication lines;

comparing in said first and second network control units of said common equipment block the function code signal portions of received message signals with those ones of said second and first function codes having been registered in said first and second network control units, respectively, which are indices to the meaning of data required to be processed by one of the equipment blocks connected to one of the coupled communication lines with which said sending equipment block is not connected;

tranferring the received message from one of said coupled communication lines to the other only when said comparison results in concurrence; and receiving a message signal in any of said equipment blocks only when one of the function codes registered in said receiving equipment block is concurrent with the function code signal portion of the message signal received on the communication line to which the receiving equipment block is connected.

2. A method according to claim 1, in which said registering of said first and second function codes in said common equipment block includes the steps of:

(a) storing in each of said first and second network control units of said common equipment block registration request codes as function codes;

(b) sending initial message signals to said coupled communication lines from the intra-line equipment blocks connected to said coupled communication lines, said initial message signals from the intra-line equipment blocks connected with said first communication line carrying information of registration requests at their function code signal portions and said first function codes at their data signal portions, while said initial message signals from the intra-line equipment blocks connected to said second communication line carry information of registration requests at their function code signal portions and said second function codes at their data signal portions; and (c) receiving said initial message signals by said common equipment block and storing said second and first function codes in said first and second network control units, respectively.

3. A method according to claim 2, further comprising the step of sending message signals from said common equipment block to said coupled first and second communication lines with said message signals including said registration request codes at their function code signal portions and function codes identical to said registered function codes at their data signal portions.

4. A method of communicating a message signal in a communication system having a plurality of closed loop communication lines a plurality of intra-line equipment blocks each connected to one of said communication lines, at least two of said communication lines being coupled to each other through a common equipment block, said common equipment block having a first network control unit connected to a first one of said coupled communication lines and a second network control unit connected to a second one of said coupled communication lines, said message signal having a format including a function code signal portion and a data signal portion, the former being an index to the latter, the method comprising the steps of:

registering in said first and second network control units of said common equipment block a plurality of second function codes for message signals to be received by intra-line equipment blocks in said second communication line and a plurality of first function codes for message signals to be received by intra-line equipment blocks in said first communication line, respectively;

sending a message signal from an equipment block in any one of said first and second communication lines;

receiving said message signal at said common equipment block;

comparing in said common equipment block the function code signal portion of said received message signal with those first and second function codes which correspond to the function code signal portions of the message signals to be received by equipment blocks in the communication line other than the communication line to which said message signal sending equipment is connected;

transferring said received message signal between said two transmission lines only when a concurrency takes place as a result of said comparison; and receiving said transferred message signal at one of the equipment blocks in which a function code concurrent with the function code signal portion of said transferred message signal is registered, said receiving equipment block being in the communication line other than the communication line to which said message signal sending equipment block is connected.

5. A message communication system comprising a plurality of communication lines each having plurality of intra-line equipment blocks connected thereto, at least a first communication line of said communication lines being coupled with at least a second communication line of said communication lines through a common equipment block connected to both of the coupled first and second communication lines, each message signal to be communicated via the first and second communication lines including a function code signal portion and a data signal portion, the function code signal portion being an index to the meaning of the data signal portion and forming in combination with the data signal portion the substance of the message signal;

said common equipment block including first and second network control units connected to said first and second communication lines respectively; and having memory means for storing function codes serving as indices to the meaning of data required to be processed by the intra-line equipment blocks connected to said second and first coupled communication lines, respectively, said first network control unit further having means for comparing the function code signal portion of a received message from said first communication line with said stored function codes serving as indices to the meaning of data required to be processed by intra-line equipment blocks connected to said second communication line, while said second network control unit further has means for comparing the function code signal portion of a received message signal from said second communication line with said stored function codes serving as indices to the meaning of data required to be processed by intra-line equipment blocks connected to said first communication line; and a processing unit interconnected between said first and second network control units and having processing and operating means responsive to tme output of said comparing means for transferring message signals received by said common equipment block from said coupled communication lines via said first and second network control units to said second and first network control units, respectively.

6. A system according to claim 5, in which said processing unit of said common equipment block further includes a first function code register for storing a registration request code as a function code for said first network control unit and storing a message signal supplied to the processing unit from said second network control unit, and a second function code register for storing a registration request code as a function code for said second network control unit and storing a message signal supplied to said processing unit from said first network control unit, said first and second function code registers being electrically associated with said processing and operating means to supply their contents to said memory means in said first and second network control units, respectively, said first and second function code registers being coupled to said processing and operating apparatus so that their contents are stored in said memory means of said first and second network control units, respectively.

* * * * *